United States Patent [19]

Mims

[11] 4,227,318
[45] Oct. 14, 1980

[54] A QUIZ GAME WITH RESPONSE INDICATION FOR CORRECT AND INCORRECT ANSWERS

[76] Inventor: Calvin Mims, 427 N. Ridgeland Ave., Oak Park, Ill. 60302

[21] Appl. No.: 12,970

[22] Filed: Feb. 21, 1979

[51] Int. Cl.³ .............................................. G09B 7/06
[52] U.S. Cl. .................................................... 35/9 B
[58] Field of Search ........................ 35/9 R, 9 A, 9 B

[56] References Cited

U.S. PATENT DOCUMENTS

| 2,720,038 | 10/1955 | Clark | 35/9 B |
| 3,221,418 | 12/1965 | Hoernes et al. | 35/9 A |
| 3,541,699 | 11/1970 | Baker, Jr. | 35/9 A |
| 4,011,664 | 3/1977 | Weisberg et al. | 35/9 B |

Primary Examiner—William H. Grieb
Attorney, Agent, or Firm—Robert G. Petrinec

[57] ABSTRACT

The game includes a multi-sided hollow game box with an opening in the top thereof. A set of selector switches are arranged in a row on each side of the box, and a set of indicators are arranged in a similar row on each side of the box. The selector switches are positioned in registry with the indicators. The opening in the top of the box is provided with means for receiving a game card. The game card has a question printed on it as well as plurality of multiple choice possible answers, only one of which is correct. The game card has the correct answer coded thereon. A code reader is located within the box and is activated by the game card. The code reader is coupled to the indicators to energize those indicators corresponding to the correct answer. The selector switches have lights associated with them and when a switch is actuated its associated light will become energized and remain energized. When a selector switch is energized and is in alignment with the indicator energized by the code reader a correct answer is indicated. When a selector switch is energized and is not in alignment with the indicator energized by the code reader a wrong answer is indicated.

8 Claims, 11 Drawing Figures

A QUIZ GAME WITH RESPONSE INDICATION FOR CORRECT AND INCORRECT ANSWERS

BACKGROUND OF THE INVENTION

The embodiment of the invention disclosed herein is directed primarily to structural improvements in a game which may be used for home entertainment. The game is provided with a box like structure having a plurality of sets of selectors and indicators. Each set of selectors has a plurality of illuminated push button switches arranged in a row along one side of the box. Each set of indicators has a plurality of illuminated indicia bearing elements also arranged in a row and corresponding to the positions of the illuminated push button switches. The game includes question cards having one or more questions on them, and these questions are to be answered by the players of the game. The question card has a coded answer for each question. When a player answers the question on the card that player indicates the answer by pressing one of the push button switches which will become illuminated. The push button switch has an inner lock and will remain illuminated. The question card is then inserted into a slot in the top of the box and the card is depressed to actuate a sensing circuit within the box. This will energize a selected one or more of the indicia bearing indicators and illuminate it. When the illuminated indicia bearing indicator corresponds in position to the illuminated selector push button switch then the answer is correct. When however, the illuminated indicia bearing element does not correspond to the position of the illuminated selector switch the selected answer is not only shown to be the wrong answer but the correct answer is indicated. Therefore, the game is not only enjoyable but educational as well.

A timer may be provided on top of the game box to be actuated when each players turn starts. This timer then measures the amount of time each player has to answer the question or set of questions, which ever the case may be. The timer may be preset at a fixed time specified on each question card to give each player the same opportunity to answer the question as the other players. The timer may also be variable to increase or decrease the time the players have to answer the question or questions.

A game board is provided to allow each player to move a game piece from a start position to a finish position. This game board may have any suitable shape and it will be understood that the configuration of the game board shown herein is only by way of examples. The game board may include game command cards that will direct the player to move to a different space on the game board. In one arrangement of the game all the sets of selectors and indicators are energized at the same time. This will allow each of the other players, those not knowing the question being answered, to know if the active player or players have answered the questions correctly or not. While there are many different arrangements of play that can be used with the present invention, it will be understood that modification of those shown herein will not depart from the basic concepts of this invention.

For example, in one arrangement of the game of this invention the players throw dice to determine the order the players will act as card holders. After this order has been determined, the first card holder selects a card. The card holder then reads the card and gives the multiple choice answers. Each player listens to the given choices and decides what is the correct answer before he or she pushes the appropriate selector button on their panel. The card holder may, shortly after reading the question, set a timer to a time value as prescribed by information on the card being read. Each player registers their answer by actuating the desired selector switch in their groupe, before the end of the alloted time period. The person being the card holder then inserts the card and the correct answer or answers will be indicated on each panel by energization of one or more of the indicating lights in the set of indicators. Those players having the correct answer will know the answer is correct because the energized indicating light will be in alignment with the energized or illuminated push button.

If all the players get a correct answer, then each player will move their game piece on the game board the number of spaces as specified on the question card. Therefore, the point value for each question will be indicated on the card. However, if the card holder is the only player to get the correct answer, the card holder will move his or her game piece the number of spaces corresponding to the product of the card value times the number of players who have the incorrect answer plus one for himself. For example, if three players do not get the correct answer, the forth player, who is the card holder and obtains the correct answer will receive twenty points for a five point question. If on the other hand, the question card indicates the value of the question to be five points and there are four players, the following may occur. Two players may get the correct answer for the question, and only one player may get an incorrect answer. The card holder now only gets to move eight spaces, four spaces for his correct answer and four spaces for the one incorrect answer from the other player. The two players with correct answers can move only the prescribed number of spaces, i.e., only four spaces each. If, however, the card holder does not give the correct answer, he or she must move their game piece rearward four spaces, or what other value may be indicated on the card.

In one arrangement of the game of this invention, if the card holder, and every other player, gives an incorrect answer, the card holder will lose his or her turn as card holder. Also, if only one person obtains the correct answer, and he or she is not the card holder for that play, that person is entitled to a "Set Back" card. With this card that player can force any other player at any time to lose his or her turn as a card holder.

If any player, in the course of moving their game piece on the game board, lands on the space marked "Lucky Breaks in Life", he or she gets a chance to roll dice. The number on the dice must be greater than the number for the value of the question. If this is accomplished then the player can move his game piece corresponding to the number on the dice times the number on the question card.

Many objects, features and advantages of the game of this invention will be more fully realized and understood from the following detailed description when taken in conjunction with the accompanying drawings wherein like reference numerals throughout the various views of the drawings are intended to designate similar elements or components, and wherein:

DETAILED DESCRIPTION OF THE ILLUSTRATED EMBODIMENT

Figure 1:
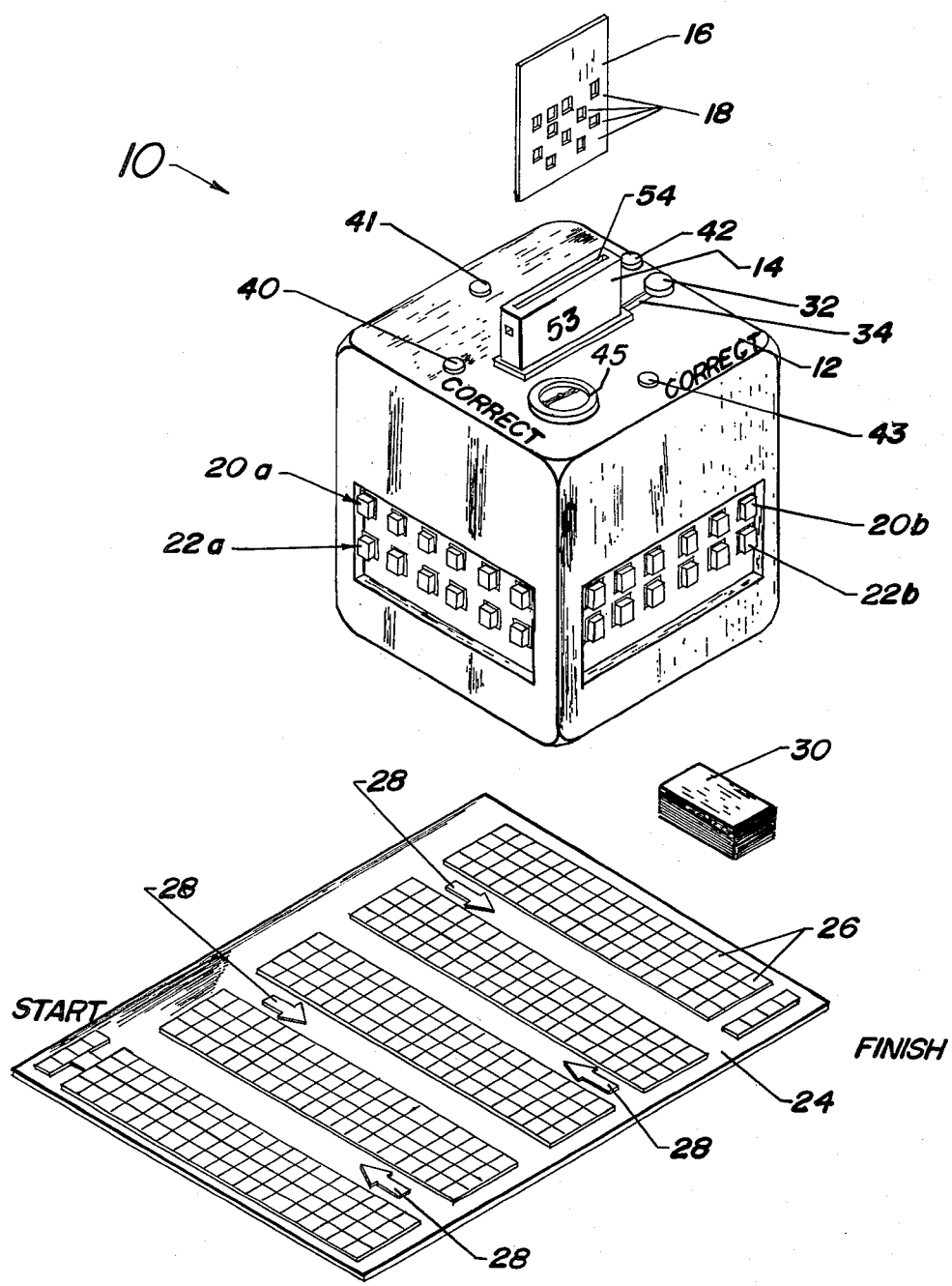
FIG. 1 is a perspective view of the various components of the present invention showing a game box, question card, game board and a stack of command cards.

Referring now to FIG. 1 there is seen an illustrated embodiment of the game of the present invention and is therein designated generally by reference numerial 10. The game 10 includes a box like structure 12 for housing all the necessary electronic circuitry and mechanism for operation of the game. The circuitry and mechanism within the box will be described more fully herein below. The box structure 12 has card receiving means 14 for receiving a game card 16 therein. The game card 16 has one or more questions printed thereon. The answer to the question may be in the form of a multiple choice selection also printed on the game card. The correct answer to the question is formed as a code on the game card by plurality of apertures 18 in a given coded pattern. When the game card 16 is inserted into the receiver 14 the coded pattern is read by light-optic means associated with the electronic circuitry within the box 12.

A plurality of sets 20a, 20b, 20c and 20d of indicators are provided in the box 12. There is one set of indicators on each side of the box 12. In the illustrated embodiment the box 12 is a four sided structure. However, it will be understood that the box 12 may have as many flat sides as desired and practical. Associated with each set of indicators 20 is a corresponding set of selector switches 22a, 22b, 22c and 22d. These switches are preferably of the inner lock type so that the actuation of one switch will cause the deactuation of a previously actuated switch.

A game board 24 has a plurality of squares 26 formed thereon. The game board may receive a game piece (not shown) for each player. The game piece is moved along the game board, in the direction of arrows 28. The number of spaces moved by each game piece may correspond to the arrangement of the game as described herein or it may correspond to some other arrangement without departing from the concept of this invention. A stack of command cards 30 may be used with the game of the present invention and these cards may also be of any desired arrangement and configuration. These command cards may either assist the player to move the game piece forward or may penalize the player by moving the game piece rearward.

The box 12 includes locking means 32 which is movable through a slot 34. The locking means 32 comes into engagement with a notch 36, FIG. 3, to hold the card receiving means 14 in a down, and actuated position, after it is depressed by the player then being the card holder. Also, mounted on top of the box 12 are four indicating lamps 40, 41, 42 and 43. These indicating lamps are energized by the circuitry within the box 12 to indicate to the other player or players, which of the players have correct answers. If a player selects the wrong answer the indicating light 40, 41, 42 and 43 in front of the player will not light up. The other players only know that a wrong answer was selected but they do not know which answer was selected. Mounted on top of the box 12 is a timer 45 which may be energized either mechanically or electrically.

Figure 3:
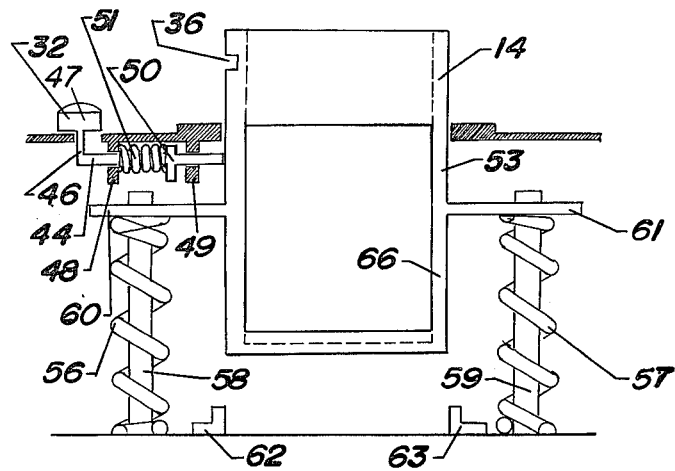
FIG. 3 is a fragmentary elevational view of one mechinism shown in FIG. 2.
Figure 2:
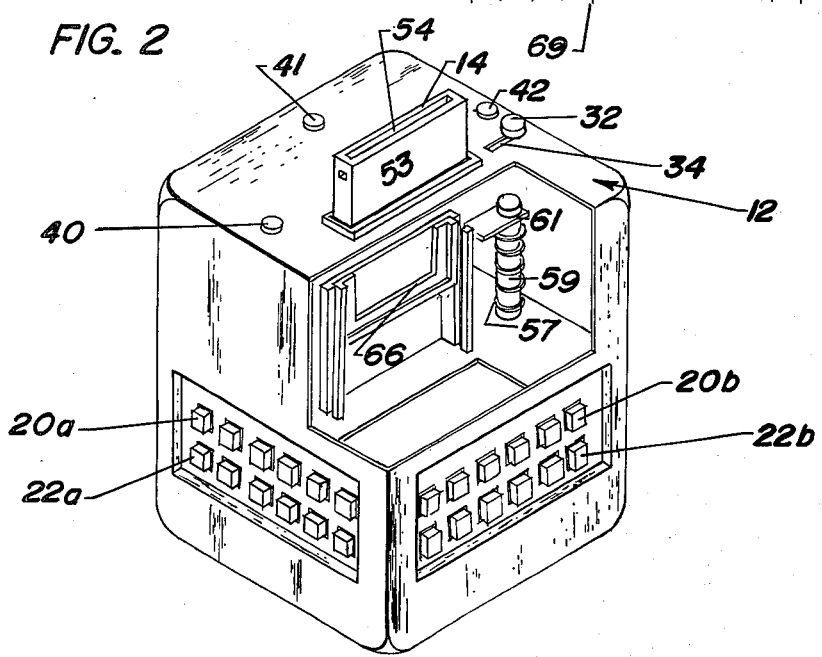
FIG. 2 is a perspective view of the game box of this invention with a portion thereof cut away to illustrate the mechanism therein.

Referring now to FIGS. 2 and 3 the details of the locking mechinism 32 are shown more fully. The locking mechinism 32 includes a slide bar 44 having an upwardly turned end portion 46 and a button 47 secured thereto and located at the top of the box 12. The slide bar 44 is movable through apertures formed in a pair of bosses 48 and 49 which are formed as part of the box 12. A retainer 50 is formed at the other end of the slide bar 44. The retainer 50 holds a spring 51 which urges the slide bar 44 toward the card receiving means 14. When the locking mechinism is moved toward the notch 36, after the card receiving means is lowered, it will remain engaged with the notch 36 by friction or other suitable means. However, it will be understood that the free end of the slide bar 44 may be provided with hook means, (not shown) to engage the notch 36.

The card receiving means 14 includes a slotted housing 53 having a slot 54 into which game cards are inserted one at a time. After a game card is inserted, the receiving means is lowered against the force of a pair of springs 56 and 57. The springs 56 and 57 are secured to a pair of posts 58 and 59, respectively. The housing 53 has arms 60 and 61 extending therefrom to engage apertures in the posts 58 and 59 respectively. Guide members 62 and 63 are formed at the bottom of the card receiving means to insure that the card is properly placed in registry with the optical reader, shown schematically in FIGS. 10 and 11. The lower portion of the housing 53 has a rectangular opening 66 so that light sources on one side of the card can pass light to light receiving means on the other side of the card through apertures formed within the card.

Figure 4:
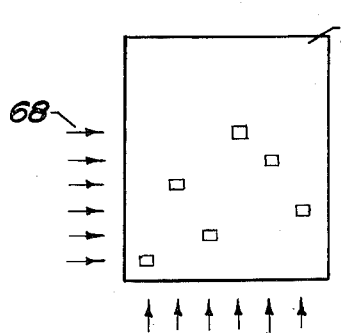
FIG. 4 illustrates one configuration of a game card of this invention.
Figure 5:
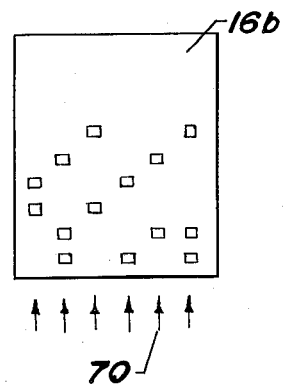
FIG. 5 illustrates another configuration of a game card of this invention.

FIGS. 4 and 5 illustrate two different configurations of game cards constructed in accordance with the present invention. The game card 16a, shown in FIG. 4, shows one configuration of apertures formed at selected cross points of an X–Y matrix as indicated by the arrows 68 and 69. FIG. 5, on the other hand, shows game card 16b having another configuration of apertures formed at spaced intervals along a column as indicated by the arrows 70. The optical reader of the present invention may read either type of card separately or consecutively.

Figure 6:
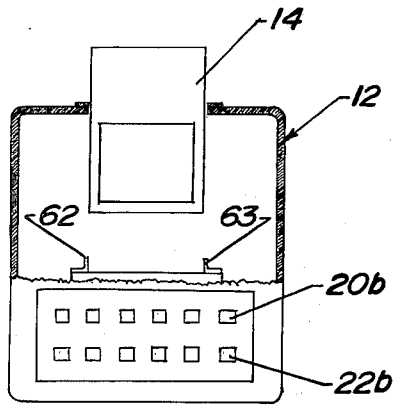
FIG. 6 is an elevational partially sectional view of the game box of this invention.
Figure 7:
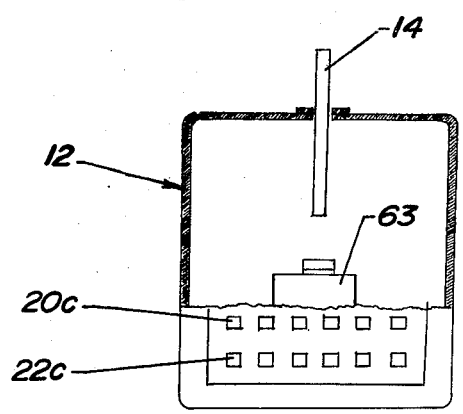
FIG. 7 is an elevational, partially sectional view of the game box of FIG. 6, but turned ninety degrees.
Figure 8:
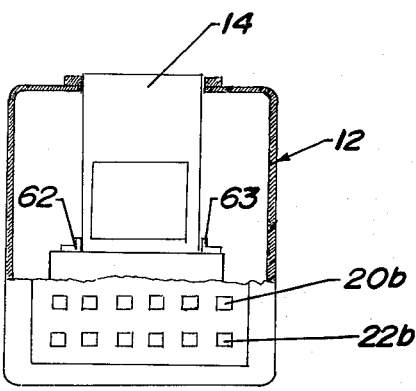
FIG. 8 is an elevational, partially sectional view of the game box of FIG. 6, but with the game card receptacle in a lowered position to allow the code information on the card to be electronically read.
Figure 9:
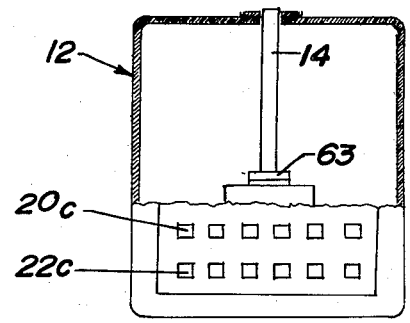
FIG. 9 is an elevational, partially sectional view of the game box of FIG. 8, but turned ninety degrees.
Figure 10:
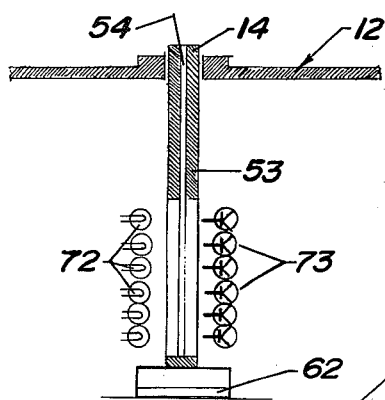
FIG. 10 is a fragmentary view of the internal components of the game box of this invention.

Referring now to FIGS. 6 and 7 the card receiving means 14 is shown in the up position so that a card can be placed therein, and in FIGS. 8 and 9 the card receiving means 14 is shown in the down position so that the card inserted can be optically read. FIG. 10 shows a fragmentary portion of the box 12 with the card receiving means in the lower portion and with optical reader means on opposite sides of the card. In the illustrated embodiment the optical reader means is formed by a plurality of discrete light sources 72 on one side of the housing 53 and a corresponding plurality of discrete light detectors 73 on the other side of the housing 53. When a game card 16 is inserted into the housing 53 and lowered into position as shown in FIG. 10 the light sources 72 are energized. The apertures formed in the game card 16 will pass light only to those selected detectors 73 which will correspond to a correct answer.

Figure 11:
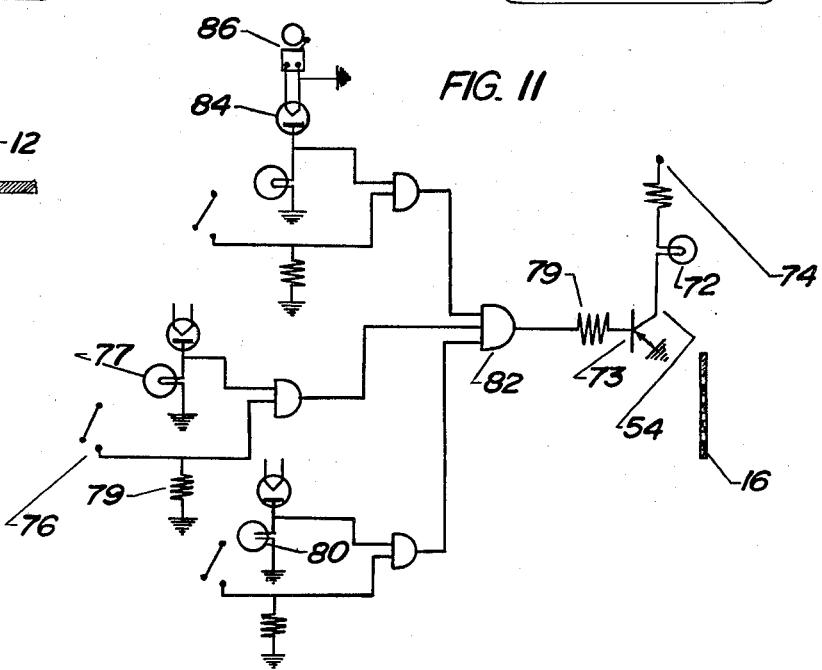
FIG. 11 is a schematic view of one set of selectors, indicators, switches and lamps, it being understood that the circuit of FIG. 11 is parallel as many times as there are sets of switches and indicators in each row.

For a better understanding of the operation of the circuitry of the present invention reference is now made to FIG. 11. Here a single circuit is shown, but it will be understood that the circuit of FIG. 11 is duplicated as many times as is necessary to provide the X-Y matrix needed to read the apertures in the game cards. A source of power is shown as a battery 74 and is used to continuously energize the lamps 72. The lamps 72 may be either of the incandescent type or of the light emitting diode type. When the game card 16 is inserted into the slot 54, as shown by the arrow of FIG. 11, all detectors 73 not in alignment with the apertures in the card will become deactivated. A selector switch 76 corresponds to one of the selector buttons 22 and has associated therewith a lamp 77. Therefore, once the switch 76 is actuated, and locked into place by the inner lock mechinism, the lamp 77, which is part of the button 22, will continue to be energized. Current that passes through the switch 76 and lamp 77 also passed through a 100 ohm resister 79 to ground. Current passing through the photo diode 73 will energize a lamp 80 and this lamp 80 corresponds to one of the indicators 20 on the box 12. Current from the photo diode 73 also passes through a diode 82 and also through the resister 79. The combined current from diodes 78 and 82 is now sufficient to energize an indicator lamp 84 and a series connected buzzer 86. The lamp 84 corresponds to one of the lamps 40, 41, 42 or 43 of FIGS. 1 and 2. The buzzer 86 is located in each of the circuits and are the same in number as there are player positions. Each of the buzzers may have a different sound so that each player with a correct answer can be identified by sound alone.

While several embodiments of this invention have been illustrated herein it will be understood that still further variations and modifications may be effected without departing from the spirit and scope of the novel concepts disclosed and claimed herein.

The invention is claimed as follows:

1. A game, comprising in combination: a multi-sided hollow game box having an opening in the top thereof; a set of selector switches arranged in a row on each side of said game box; a set of indicators arranged in a row on each side of said game box, said selector switches and said indicators being in registry with one another; means in said opening for receiving a game card; a game card having coded information thereon for energizing selective ones of said indicator in each of said sets of indicators, said game card having questions printed thereon to be answered by actuating at least one of the selector switches in said set of selector switches, and code reader means within said hollow game box to read the coded information on said game card and provide an indication of the correct answer to the question on said game card, whereby alignment of an energized selector switch and an energized indicator will indicate a correct answer, and misalignment of an energized selector switch and and energized indicator will indicate a wrong answer.

2. A game as set forth in claim 1 further including timer means secured to said box, said timer means being setable to a value corresponding to the difficulty of the question on said game card.

3. A game as set forth in claim 1 further including hold down means cooperable with said means to receive said card, said hold down means holding said card in position whereby said code reader can continue to read the coded information on said game card until said hold down means is released.

4. A game as set forth in claim 1 wherein said set of selector switches are inner locked so that the actuation of one switch will cause the deactivation of a previously actuated selector switch.

5. A game as set forth in claim 1 further including correct indicator means at the top of each side of said box to indicate to other players when a correct answer was selected by each player.

6. A game as set forth in claim 1 wherein said code reader means includes a plurality of light emitting means arranged on one side of siad game card and a plurality of light responsive means arranged on the other side of said game card, and wherein said coded information is in the form of at least one aperture within said game card, and energization of at least one of said light responsive means will cause actuation of the appropriate indicator in each set of indicators.

7. The game as set forth in claim 1 further including a game board upon which game pieces are placed and move along a given path, the distance of movement of said game pieces corresponds to the product of the number of players with a wrong answer and a given value for each question as indicated on the game card.

8. The game as set forth in claim 6 wherein said coded information on said game card is in the form of apertures positioned at selective points in an X—Y matrix, and said light emitting means and said light responsive means are arranged in an X—Y matrix on opposite sides of said game card.

* * * * *